United States Patent
Ou Yang et al.

(10) Patent No.: US 10,272,332 B2
(45) Date of Patent: Apr. 30, 2019

(54) HAPTIC FEEDBACK DEVICE FOR STEERING SIMULATION

(71) Applicant: BROGENT TECHNOLOGIES INC., Kaohsiung (TW)

(72) Inventors: Chih-Hung Ou Yang, Kaohsiung (TW); Yih-Chang Hsieh, Kaohsiung (TW); Meng-Wen Li, Kaohsiung (TW)

(73) Assignee: BROGENT TECHNOLOGIES INC., Kaohsiung (TW)

(*) Notice: Subject to any disclaimer, the term of this patent is extended or adjusted under 35 U.S.C. 154(b) by 0 days.

(21) Appl. No.: 15/665,817

(22) Filed: Aug. 1, 2017

(65) Prior Publication Data

US 2019/0038971 A1   Feb. 7, 2019

(51) Int. Cl.
   *A63F 13/56*   (2014.01)
   *A63F 13/245*   (2014.01)
   *A63F 13/285*   (2014.01)

(52) U.S. Cl.
   CPC .......... *A63F 13/285* (2014.09); *A63F 13/245* (2014.09); *A63F 13/56* (2014.09)

(58) Field of Classification Search
   CPC ....... A63F 13/285; A63F 13/245; A63F 13/56
   See application file for complete search history.

(56) References Cited

U.S. PATENT DOCUMENTS

| | | | |
|---|---|---|---|
| 4,019,261 A | 4/1977 | Pancoe | |
| 5,209,662 A | 5/1993 | Fujita et al. | |
| 6,142,877 A * | 11/2000 | Nishimura | A63F 13/08 434/62 |
| 2005/0255925 A1 * | 11/2005 | Brase | A47C 3/16 463/47 |

FOREIGN PATENT DOCUMENTS

TW   I357346 B   2/2012

* cited by examiner

*Primary Examiner* — William H McCulloch, Jr.
*Assistant Examiner* — Yingchuan Zhang
(74) *Attorney, Agent, or Firm* — Muncy, Geissler, Olds & Lowe, P.C.

(57) ABSTRACT

A haptic feedback device for steering simulation comprises a base unit and a rolling unit. The base unit includes a base, a base supporting body, a first rolling component, and a second rolling component. A roll center line is formed by the first and the second rolling components. The rolling unit includes a rolling base and a rolling supporting body. One part of the rolling base is pivotally connected to the first rolling component, and one part of the rolling supporting body is pivotally connected to the second rolling component, so that the rolling base can rotate around the roll center line and a cone rotation can be performed. A length-adjustable actuator is disposed on the rolling supporting body, so that rectilinear motion with orthogonal direction can be performed by the rolling base on the radius tangent of cone rotation.

13 Claims, 14 Drawing Sheets

HAPTIC FEEDBACK DEVICE FOR STEERING SIMULATION

BACKGROUND OF THE INVENTION a) Field of the Invention

The present invention relates to a haptic feedback device, and more particularly to a haptic feedback device for steering simulation with improved wheel slip effect.

b) Description of the Prior Art

In electronic game arcades, haptic feedback arcade games are popular with players, because they can interact with players and offer exercise feedback player can experience virtual reality, which makes haptic feedback arcade games welcomed. Besides, in large amusement parks, haptic feedback recreational facilities are always popular and full of people.

Motorcycle companies with well initial development produce racing training simulators for simulating the body actual motion while riding. In addition, the movement of motorcycle is presented by three degrees of freedom: roll, pitch, and yaw.

Please refer to FIG. 1, which concerns Taiwan Patent No. 1357346, a motorcycle gaming device 30 with wheel slip effect, which includes a motorcycle body 32, a tilt mechanism 38, and a rolling mechanism 40. The rolling mechanism 40 is located below the motorcycle body 32 and the tilt mechanism 38, including an axis 70 and a motor 72. A first pulley 7002 is disposed on the axis 70, a second pulley 7202 disposed on the motor 72, a belt 74 disposed between the first and the second pulleys 7002, 7202 for rolling, and the motion of body 32 is controlled by the motor 72, so that the motorcycle body 32 can simulate the wheel slip.

Please refer to FIG. 2, which concerns U.S. Pat. No. 5,209,662 A, entitled "Riding simulation system of motorcycle", which includes a base 1, a movable carriage 2, a movable mechanisms 6, and a model motorcycle 13. A slide member 7 being capable to slide the model motorcycle 13, an elevation frames 8 being capable to elevate the model motorcycle 13, and a motor 17 being capable to lean the model motorcycle 13 in leftward or rightward direction are disposed on the movable mechanisms 6.

In the aforementioned riding simulation system, the roll movement is constructed by the motor 17, the pitch movement is constructed by the movable carriage 2, and the yaw movement is constructed by the slide member 7, so that the actual riding experience can be simulated for training.

Please refer to FIG. 3, which concerns U.S. Pat. No. 4,019,261 A entitled "Motion system for a flight simulator", which includes a base frame 32, an lift actuator 28 of a heave frame 24, an actuator 26 of a pitch frame 20 and a roll actuator 22 of roll frame 16, so that roll, pitch and heave movement can be provided to a cockpit 10.

The multiple haptic feedback technique is disclosed by the prior arts, but its center line of roll is disposed below or in the center of the model motorcycle, so that the model motorcycle can only swing or lean in rightward or leftward directions. When rotating around the rotation center line to perform cylindrical rotation, if the model motorcycle simulates multiple motions, plural actuators are required, and haptic feedback system will become more complicate.

However, certain problems exist in the current device and system:

1. Less Realistic Haptic Feedback

In the motorcycle gaming device, it has rolling mechanism to move the motorcycle body, so wheel slip motion can be simulated, but rolling the motorcycle body is lack of outward slip effect, and haptic feedback is not realistic enough.

2. Wasting More Energy

The swing structure in the conventional motorcycle gaming device is located below the motorcycle body, so the body center of gravity is higher, no matter the motorcycle body is driven by feet or motor, more energy is wasted for supporting a higher center.

3. Complicate Mechanism Structure

In prior art system, the slide member can control the side slip of rear wheel to simulate yaw movement. However, if more realistic slip or other haptic feedback is required, more actuators are required for stimulating roll, pitch and yaw movements, and the mechanism structure will become relatively complicate.

Therefore, developing a mechanism structure with less power components to simulate various haptic feedback which can applied to other haptic feedback recreational facilities is the objective those in the field are seeking to achieve.

SUMMARY OF THE INVENTION

Therefore, an objective of an embodiment of the present invention is to provide a haptic feedback device, comprising a base unit and a rolling unit.

The base unit includes a base, a base supporting body extended upward from the base, a first rolling component located on the base, and a second rolling component located on top of the base supporting body. A roll center line is formed by the first and the second rolling components.

The rolling unit includes a rolling base being capable of carrying at least one person, and a rolling supporting body connected to the rolling base. One part of the rolling base is pivotally connected to the first rolling component, and one part of the rolling supporting body is pivotally connected to the second rolling component, so that the rolling base can rotate around the roll center line and a cone rotation can be performed.

Another technique of an embodiment of the present invention is that the first and the second rolling components are respective bearings, and the roll center of the first and the second rolling components is aligned with the roll center line.

Another technique of an embodiment of the present invention is that height of the first component is lower than the second rolling component.

Another technique of an embodiment of the present invention is that the rolling unit further includes a rotating power component being capable of rotating the rolling base.

Another technique of an embodiment of the present invention is that the rolling supporting body is provided with a length-adjustable actuation component to control the length of rolling supporting body.

Another technique of an embodiment of the present invention is that the rolling unit further includes a first joint component disposed between the first rolling component and the rolling base, a second joint component disposed between the second rolling component and the rolling supporting body, and a third joint component disposed between the rolling base and the rolling supporting body.

Another technique of an embodiment of the present invention is that the rolling supporting body is provided with a first rolling supporting shaft connected to the second rolling component, and a second rolling supporting shaft connected to the third joint component. The rolling unit further includes a fourth joint component disposed between the first and the second rolling supporting shafts.

Another technique of an embodiment of the present invention is that a carrying component being capable of carrying a person is disposed on the rolling base, which is selected from a set consisting of standing platform, standard seat, straddle seat, supine-position platform, and prone-position platform.

Another technique of an embodiment of the present invention is that the present invention further includes a motorcycle gaming unit, a motorcycle controlling component disposed on the rolling base, a game controlling component electrically connected to the motorcycle controlling component, and a game display component electrically connected to the game controlling component. A controlling order can be sent to the game controlling component by the motorcycle controlling component, so that the game controlling component can control the rotating power component, the actuation component and the game display component.

Another technique of an embodiment of the present invention is that the present invention further includes a haptic feedback unit, which includes a haptic feedback controlling component installed with a haptic feedback program, and an image display component electrically connected to the haptic feedback controlling component. When the haptic feedback program is executed by the haptic feedback controlling component, the rotating power component, the actuation component and the image display component can be controlled.

Another technique of an embodiment of the present invention is that the present invention further comprises a slip gaming unit, which includes an angle detecting part being capable of detecting the rotating angle of the rolling base, a game controlling component electrically connected to the angle detecting part, and a game display component electrically connected to the game controlling component. When the game controlling component executes a game program, and receives the angle information detected by the angle detecting part, the rotating power component, the actuation component and the game display component can be controlled.

An advantage of embodiments of the invention is that the rolling base uses the first rolling component as a cone apex, and uses the rotating center line as center, a cone pendulum or rotation can be performed. When the rolling base driven by the rotating power component swings around in a cone pendulum, the centrifugal effect of motorcycle leaning motion can be simulated, such a like roll, pitch and yaw movement. The conventional motorcycle simulating devices use plural motors to simulate the actual steering operation of motorcycle, and the present invention can effectively reduce the amount of motors.

The actuation component can control one part of the rolling base to move outward, so that actual riding slip situation can be simulated, and is more realistic than the conventional rotating motorcycle carriage technique. Besides, the present invention can be applied to large haptic feedback cabin, and when the rolling base is rotated to the top by the rotating power component, diving motion can be simulated.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Specific structural and functional details disclosed herein will become apparent from the following description of the seven preferred embodiments of the present invention taken in conjunction with the accompanying drawings. Before explaining the present invention in detail, it is to be understood that similar elements are labeled with the same reference numbers.

Figure 1:
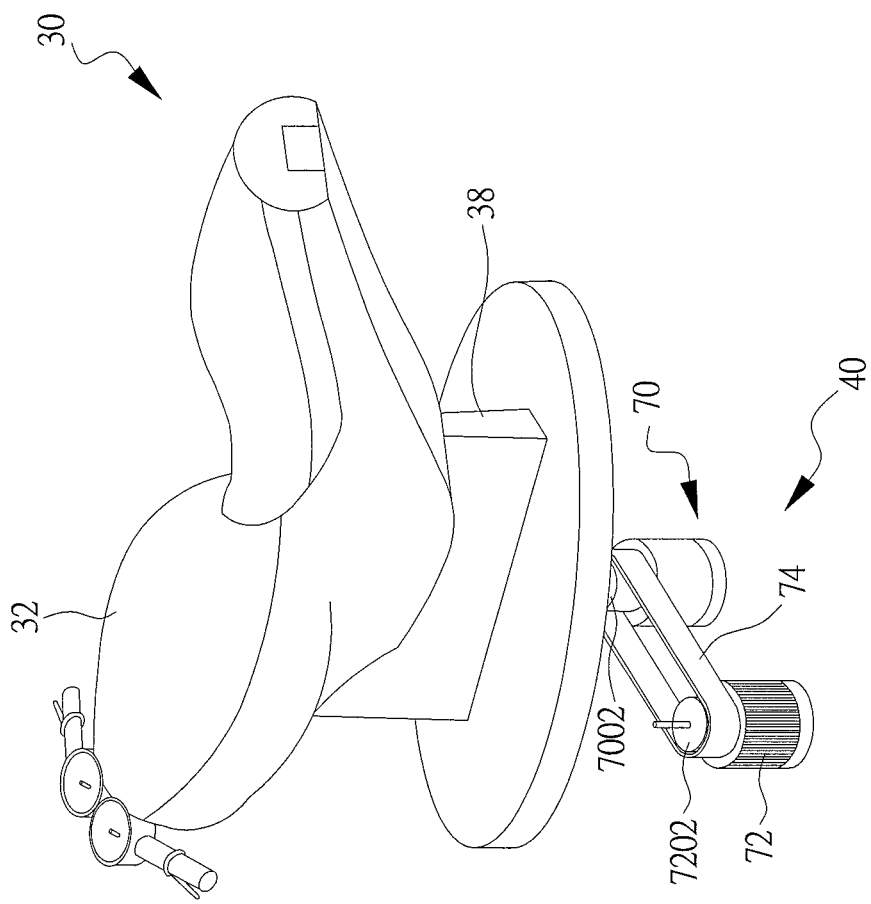
FIG. 1 is a side view of Taiwan Patent No. 1357346, a motorcycle gaming device with wheel slip effect.
Figure 2:
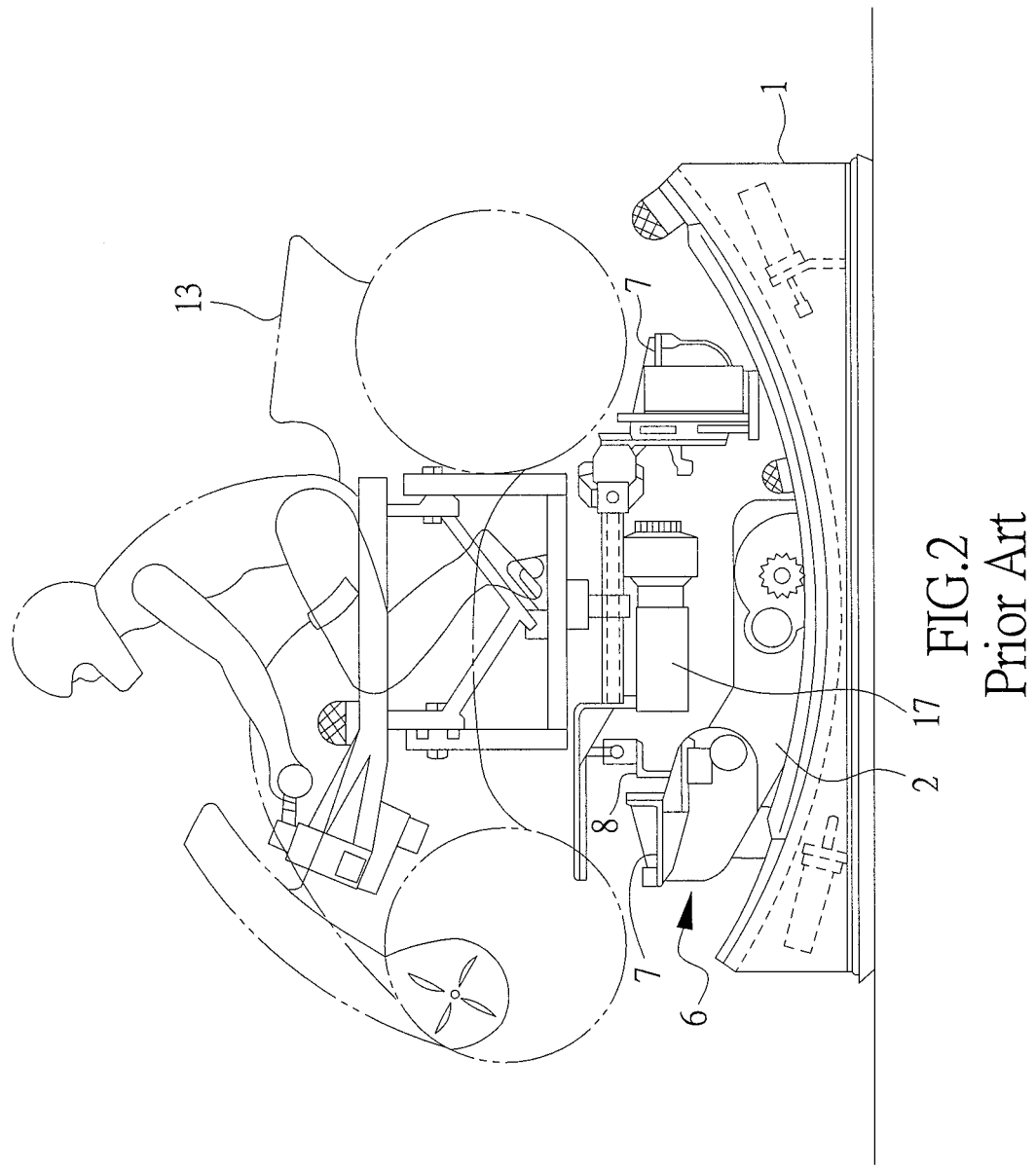
FIG. 2 is a side view of U.S. Pat. No. 5,209,662 A, a riding simulation system of motorcycle.
Figure 3:
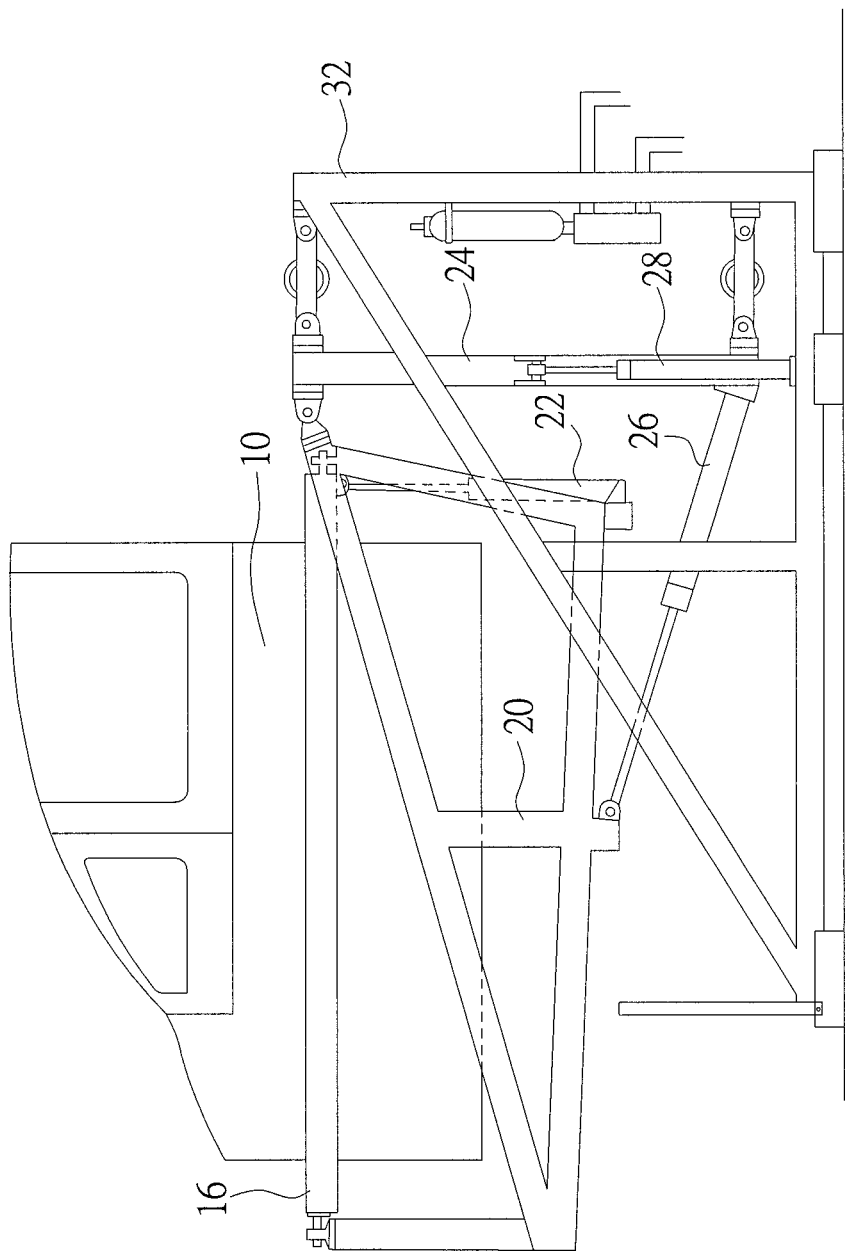
FIG. 3 is a side view of U.S. Pat. No. 4,019,261 A, a motion system for a flight simulator.
Figure 4:
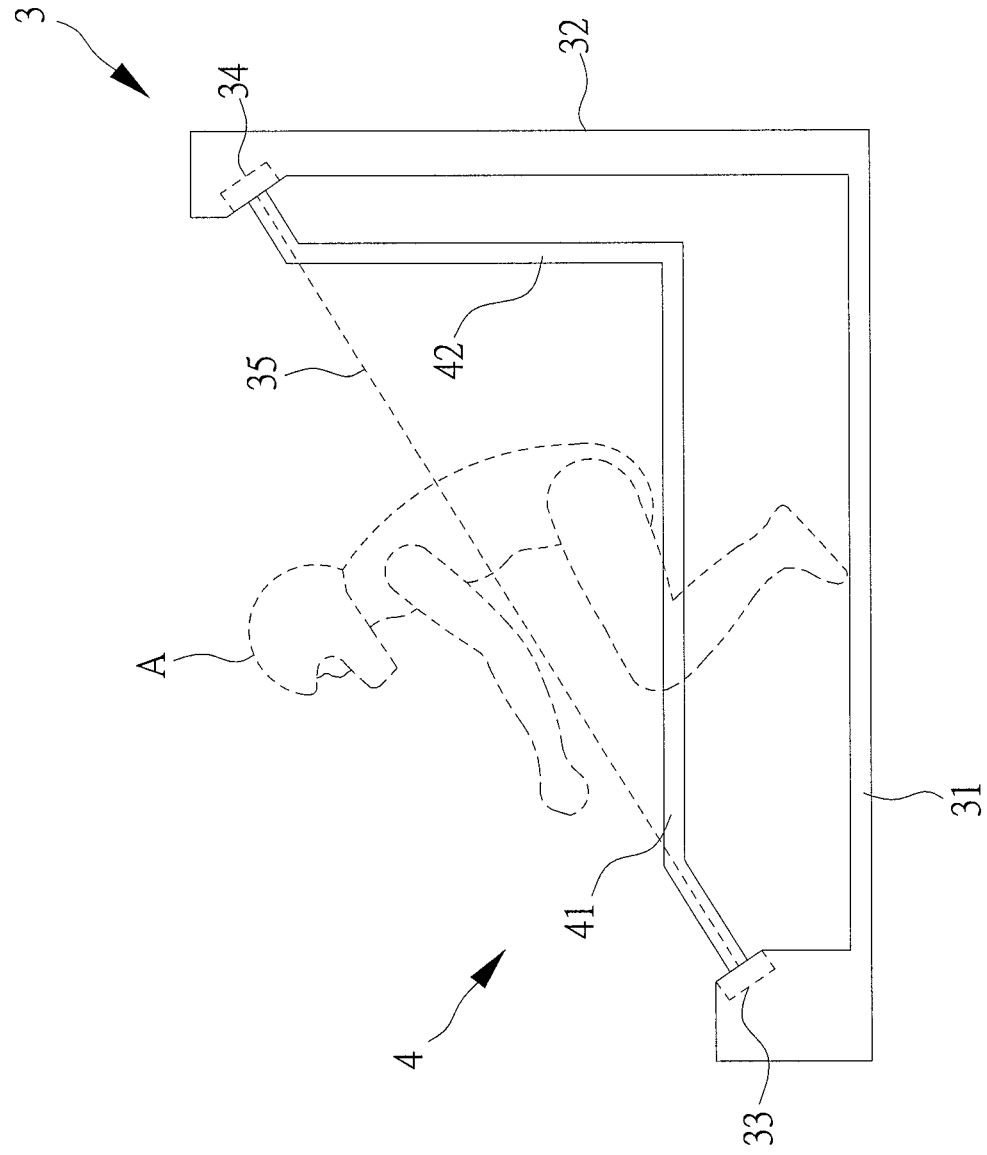
FIG. 4 is a side view of a first preferred embodiment according to the present invention.

With reference to FIG. 4, a first preferred embodiment according to an embodiment of the present invention is depicted by which at least a person A can experience the steering, comprising a base unit 3 and a rolling unit 4.

The base unit 3 includes a base 31, a base supporting body 32 extended upward from the base 31, a first rolling component 33 located on the base 31, and a second rolling component 34 located on top of the base supporting body 32.

The first rolling component 33 is separated from base supporting body 32 in a certain interval, and a roll center line 35 is formed by the first and the second rolling components 33, 34.

The rolling unit 4 includes a rolling base 41 being capable of carrying the person A, and a rolling supporting body 42 connected to the rolling base 41. One part of the rolling base 41 is pivotally connected to the first rolling component 33, and one part of the rolling supporting body 42 is pivotally connected to the second rolling component 34, so that the rolling base 41 can rotate around the roll center line 35 and a cone rotation can be performed. In addition, the person A sitting on the rolling base 41 faces the first rolling component 33.

The first and the second rolling components 33, 34 are bearings of the rolling unit 4. In this case, the first and the second rolling component 33, 34 can be apertures formed on the base 31 and the base supporting body 32, and so should not be construed as limiting the invention.

The roll center of the first and the second rolling components 33, 34 is aligned with the roll center line 35, and the roll center of the first and the second rolling components 33, 34 is the roll center line 35, so that the rolling unit 4 can rotate around the roll center line 35 smoothly. Moreover, the rolling base 41 can rotate around the roll center line 35 and a cone rotation can be performed.

The cone image depicted herein is a conical surface of a conical cylinder which is a three-dimensional geometric shape that tapers smoothly from a flat circle to a point. The circle is called base, and the point is called apex, the surface generated between the base and point is called conical surface, and the rolling base 41 rotates around the conical surface to perform a cone rotation.

Preferably, the motorcycle seat can be located on the rolling base 41, so that the person A can sit astride the rolling base 41. Force can be applied to the base 31 or the ground by the person A's feet, so that the rolling base 41 can rotate around the first rolling component 22 presented as a cone apex to perform a cone rotation. In this case, height of the first rolling component 33 is lower than the second rolling component 34, so that when the rolling base 41 is rotating, the actual knee down motion can be simulated. In addition, when the rolling base 41 is rotating, the roll, pitch and yaw motion can also be simulated.

The first preferred embodiment can be applied to the steering control in the current racing game, so that the motorcycle direction in the game can be controlled by swinging the motorcycle body. For example, if the motorcycle can turn in left or right by leaning the motorcycle body in leftward or rightward direction.

In addition, the gaming display can be located on the base 31 or the ground, so tilt in the display is controlled by software in response to the swing of the motorcycle body. The controlling technique in racing game is already applied to various gaming systems, and so details related to this are not explained further herein. In this case, a three-dimensional environment can be displayed by a head mount display and virtual reality technology which can offer the users a realistic visual experience, so that they can observe the objects in three-dimensional environment directly.

In the first preferred embodiment, the motorcycle body is heading toward the first rolling component 33, and the motorcycle seat is horizontally placed, when the person A swings the rolling base 41 by feet, the steering or knee down movement can be simulated. Compare to the leaning controlling technique in the conventional racing game, the haptic feedback effect of operation presented to the person A is added in the present invention.

The axle mechanism for tilt in conventional racing games is located below the motorcycle body, and the roll center is high, so much force is required to move back the leaned body by the person A.

The roll center of rolling base 41 in the first preferred embodiment is located different in response to motorcycle structure, but the rolling base 41 rotates around the roll center line 35 to perform a cone rotation, and the roll center of the rolling base 41 moves closer to the roll center line 35, so that the person A can swing the rolling base 41 with less force, and can efficiently spend less energy.

Figure 5:
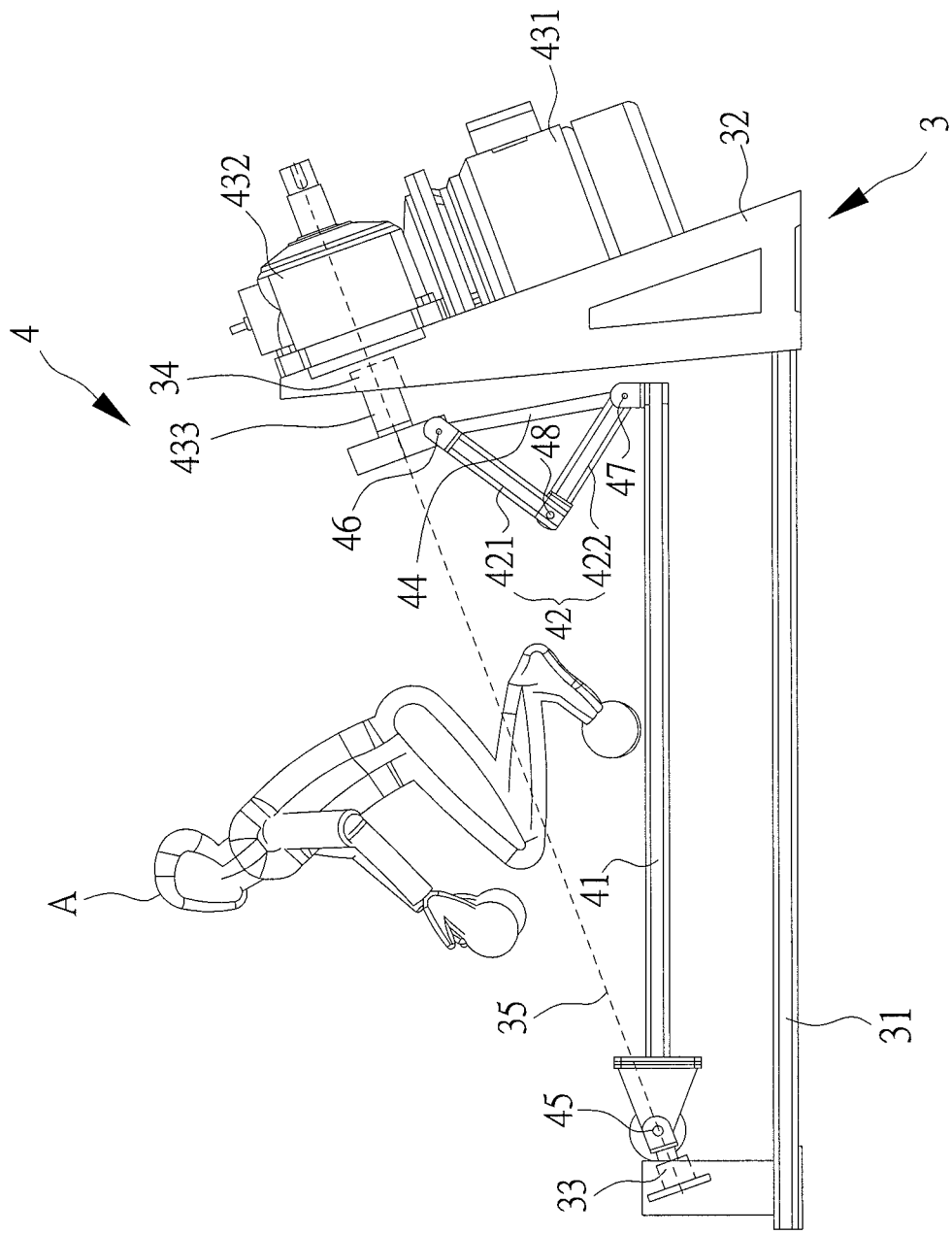
FIG. 5 is a side view of a second preferred embodiment according to the present invention.
Figure 6:
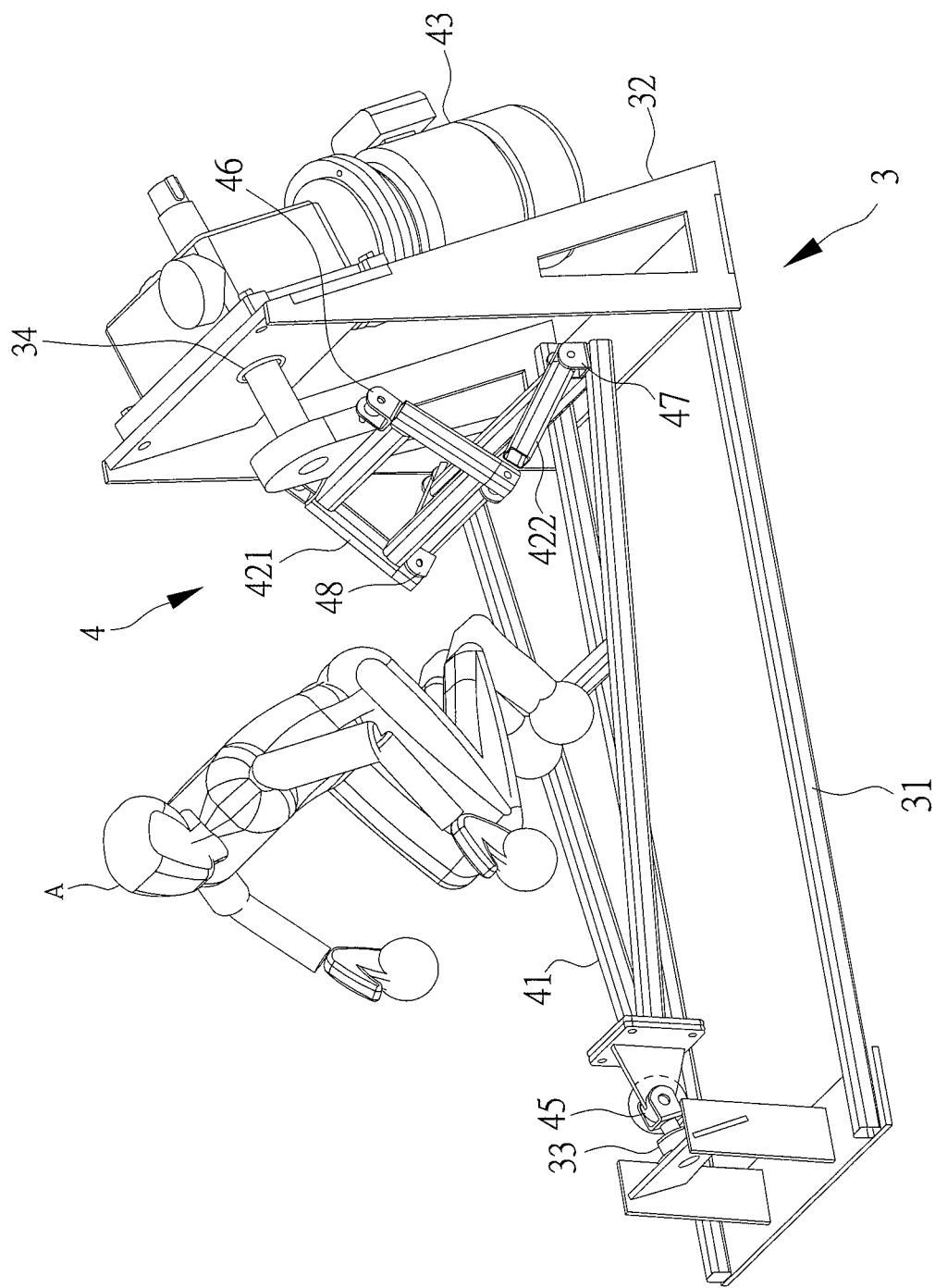
FIG. 6 is a detailed view of the device illustrated in FIG. 5.

With reference to FIGS. 5 and 6, a second preferred embodiment according to an embodiment of the present invention is depicted which is similar to the first embodiment, and so common features are not described again. The difference is that the rolling unit 4 further includes a rotating power component 43 being capable of rotating the rolling base 41, and a length-adjustable actuation component 44 disposed on the rolling supporting body 42.

The length-adjustable actuation component 44 can control the length of rolling supporting body 42. The rolling supporting body 42 is provided with a first rolling supporting shaft 421 connected to the second rolling component 34, and a second rolling supporting shaft 422 connected to a third joint component 47, so that the rolling supporting body 42 can be a movable supporting arm.

The rolling unit 4 further includes a first joint component 45 disposed between the first rolling component 33 and the rolling base 41, a second joint component 46 disposed between the second rolling component 34 and the rolling supporting body 42, the third joint component 47 disposed between the rolling base 41 and the rolling supporting body 42, and a fourth joint component 48 disposed between the first and the second rolling supporting shafts 421, 422.

The rotating power component 43 is controlled by the second rolling component 34, so that the rolling unit 4 opposed to the base unit 3 can rotate. In the second preferred embodiment, the rotating power component 43 can be located on top of the base supporting 32. In this case, the rotating power component 43 can be also disposed on the first rolling component 33, and so should not be construed as limiting the invention.

The rotating power component is provided with a motor 431, a differential 432 connected to the motor, and a rotating shaft 433 connected to the differential. The rotating shaft 433 is driven by the motor, so that the rolling base 41 is driven to rotate.

Preferably, the center of rotating shaft 433 is located on the roll center line 35, the motor 431 is located on the base supporting 32, and the rotating shaft 433 drilling through the second rolling component 34 and connected to the rolling supporting body 42, so that the rolling base 41 can rotate. The motor drive platform is a common technique, and so details related to this are not explained further herein.

Figure 7:
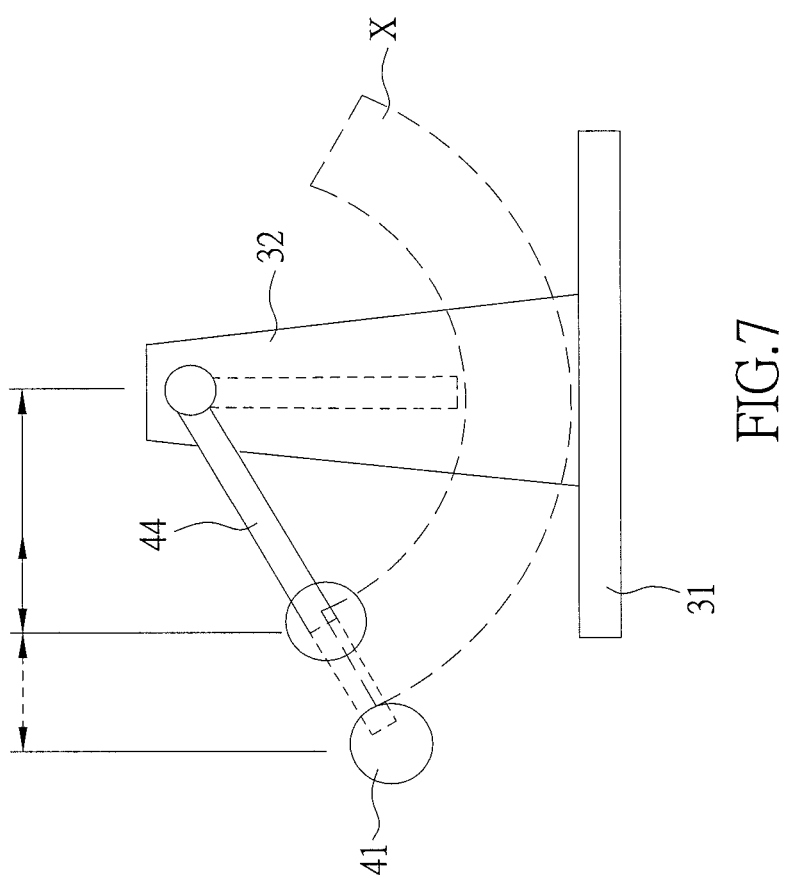
FIG. 7 is a perspective view depicting the rolling of the second embodiment.
Figure 8:
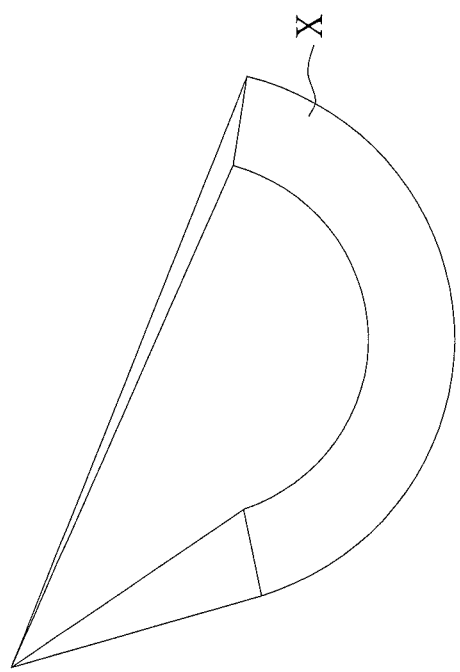
FIG. 8 is a side view depicting the rolling trace of the second embodiment.

With reference to FIGS. 7 and 8, when the length of the rolling supporting body 42 is extended by the actuation component 44, on part of the rolling base 41 is pushed outward by the rolling supporting body. Therefore, the angle between the first rolling component 33 and the rolling base 41, the one between the second rolling component 34 and the rolling supporting body 42, and the one between the rolling base 41 and the rolling supporting body 42 will be changed.

Therefore, the inventor places the first, the second, and the third joint components 45, 46, 47 in the rolling unit 4. The first, the second, and the third joint components 45, 46, 47 are a kind of joint mechanism, so that they can be in response to the rolling unit 4 when the actuation component 44 is moving. The fourth joint component 48 disposed between the first and the second rolling supporting shafts 421, 422 can be in response to the actuator component 44.

In addition, the first, the second, the third and the fourth joint components 45, 46, 47, 48 can support the rotating power component 43, so that the rolling base 41 can rotate in a cone rotation area X. The joint structure using for bending is a common technique, and so details related to this are not explained further herein.

In addition, handles can be disposed on the rolling base 41, so that the person A can control the direction of the rotating power component 43 and the rolling base 41, and the feet controlling in the first preferred embodiment can be replaced. In this case, the rolling base 41 can be controlled by feet instead of by the rotating power component 43, and so should not be construed as limiting the invention.

Preferably, the actuation component 44 is an actuator which can control the length of the rolling supporting body 42. The actuator technique is a common technique, and so details related to this are not explained further herein.

One part of the rolling base 41 can be pushed outward quickly by the actuation component 44, so that acceleration, deceleration and slip of riding experience can be simulated. When the rolling supporting body 42 is vertical to the ground, the actuation component 44 can lower the rear wheel when accelerating, and can lift the rear wheel when decelerating. When the rolling base 41 is driven by the rotating power component 43, the knee down movement happened with fast speed can be simulated by the actuation component 44.

Figure 9:
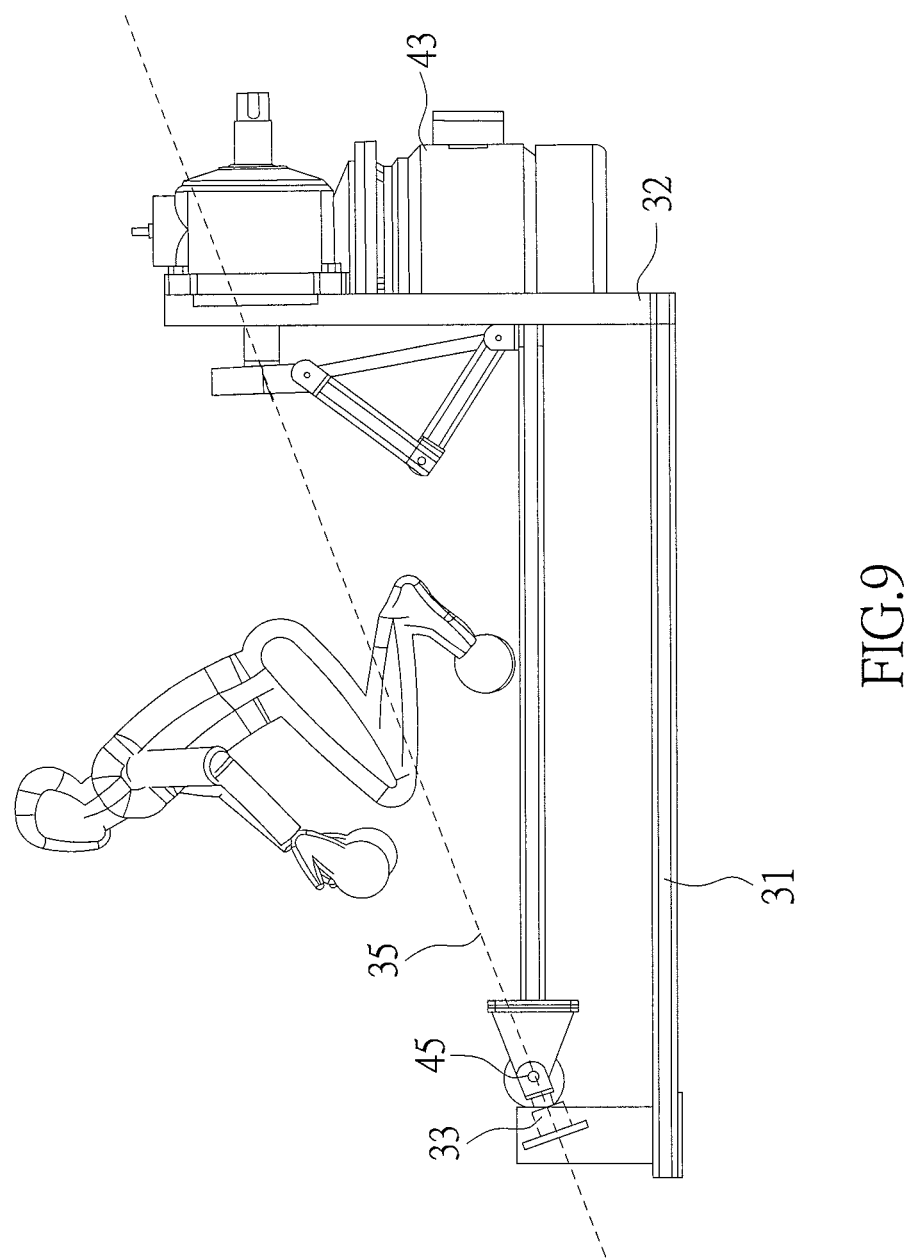
FIG. 9 is a side view of a third preferred embodiment according to the present invention.

With reference to FIG. 9, a third preferred embodiment according to an embodiment of the present invention is depicted which is similar to the second embodiment, and so common features are not described again. The difference is that the rotation center of the rotating shaft 433 in the rotating power component 43 is not aligned with the roll center line 35.

Because the rolling unit 4 equipped with the first, the second and the third joint components 45, 46, 47 can be in response to the distortion of the rolling base 41 and the rolling supporting body 42 caused by the actuation component 44, so that the roll center of the rotating shaft 433 is not necessary to align with the roll center line 35. The rolling base 41 can be driven smoothly by the rotating power component 43, and the rolling base 41 can rotate around the roll center line 35 to perform a cone rotation.

Figure 10:
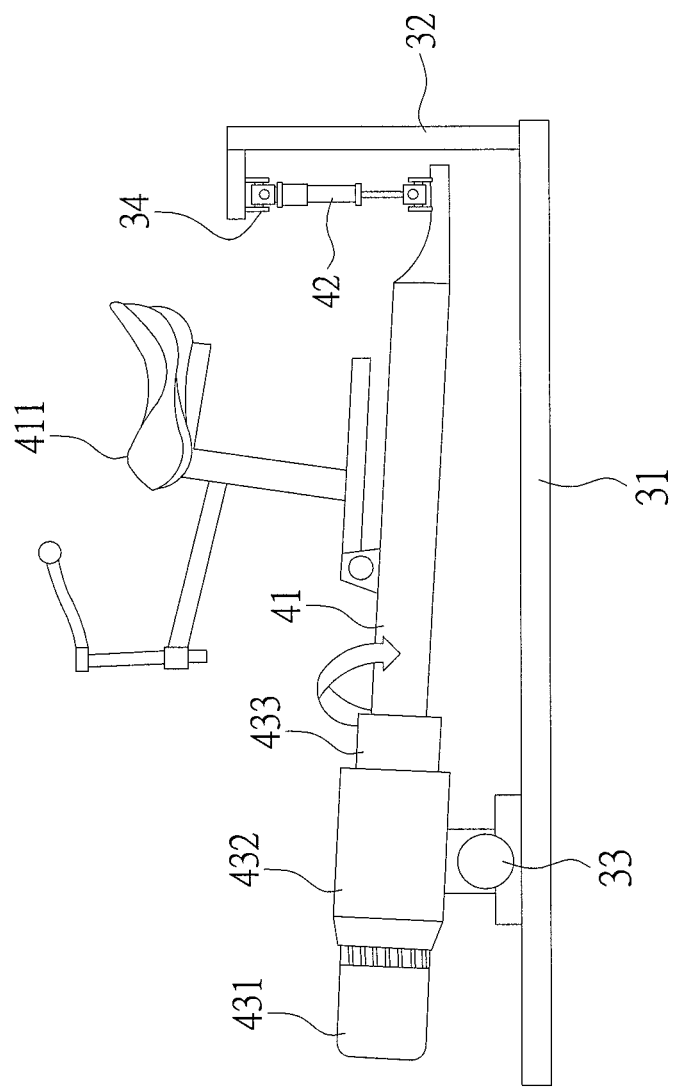
FIG. 10 is a side view of a fourth preferred embodiment according to the present invention.

With reference to FIG. 10, a fourth preferred embodiment according to an embodiment of the present invention is depicted which is similar to the second embodiment, and so common features are not described again. The difference is that a carrying component 411 being capable of carrying the person A is disposed on the rolling base 41, and the motor 431, the differential 432, and the rotating shaft 433 are disposed on the first rolling component 33.

The carrying component 411 is selected from a set consisting of standing platform, standard seat, straddle seat, supine-position platform, and prone-position platform. The carrying component 411 in the fourth preferred embodiment is a standard seat, so that the person A can have riding experience.

When the carrying component 411 is a standing platform, the person A can have water or snow skiing experience. When the carrying component 411 is a standard seat, the person A can have an airplane or spaceship seating experience. When the carrying component 411 is a supine-position platform, the person A can have water slide experience. When the carrying component 411 is a prone-position platform, the person A can have hang gliding experience.

In addition, a motor component is located below the rolling base 41 to drive the rolling base 41, or a swing component with at least two axles to improve the haptic feedback.

Preferably, a Stewart platform based manipulator can be formed by the plural swing components, multiple physical motion including sway, surge and heave can be simulated. In this case, the swing component with at least two axles is applied, and so should not be construed as limiting the invention. The technique of driving a platform by motor or using swing component to move a platform is very common, and so details related to this are not explained further herein.

Figure 11:
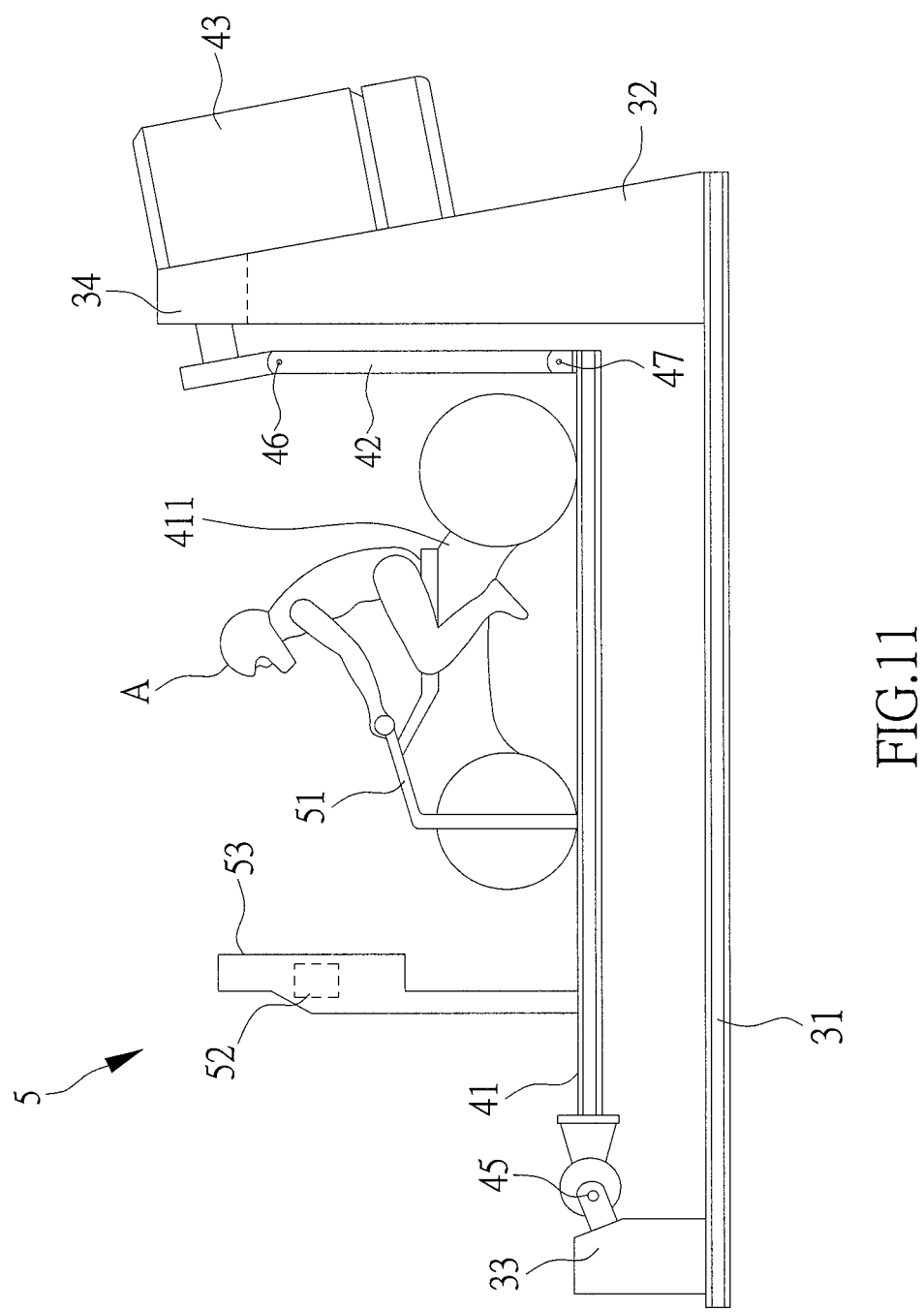
FIG. 11 is a side view of a fifth preferred embodiment according to the present invention.

With reference to FIG. 11, a fifth preferred embodiment according to an embodiment of the present invention is depicted which is similar to the second embodiment, and so common features are not described again. The difference is that the present invention further includes a motorcycle gaming unit 5.

The motorcycle gaming unit 5 includes a motorcycle controlling component 51 disposed on the rolling base 41, a game controlling component 52 electrically connected to the motorcycle controlling component 51, and a game display component 53 electrically connected to the game controlling component 52.

The carrying component 411 is a straddle seat mounted on the motorcycle model. A controlling order can be sent to the game controlling component 52 by the motorcycle controlling component 51, so that the game controlling component 52 can control the rotating power component 43, the actuation component 44 and the game display component 53.

Preferably, motorcycle controlling component 51 is handles of motorcycle providing the person A to control the driving direction. The game controlling component 52 is computer device for executing racing game program, it can receive the person A's order for controlling the motorcycle controlling component 51, after computing, the image and sound effect can be displayed on the game display component 53, so that the person A can have visual and audio effects.

In addition, when the motorcycle controlling component 51 turns left or right in a certain angle which will send a turn left or right order to the game controlling component 52, so that the rolling base 41 can lean or turn leftward or rightward which is driven by the rotating power component 43, and offer the person A haptic feedback.

Furthermore, various road conditions and driving situation of the person A can be simulated by the program executed by the game controlling component 52, and the haptic feedback can be offered by the present invention.

For example, when the rider speed in the game is too high and the lean angle is too steep, the wheel slip will be detected by program, and the actuation component 44 controlled by the game controlling component 52 will simulate the rear wheel slip, so that the person A can have haptic feedback of wheel slip.

Figure 12:
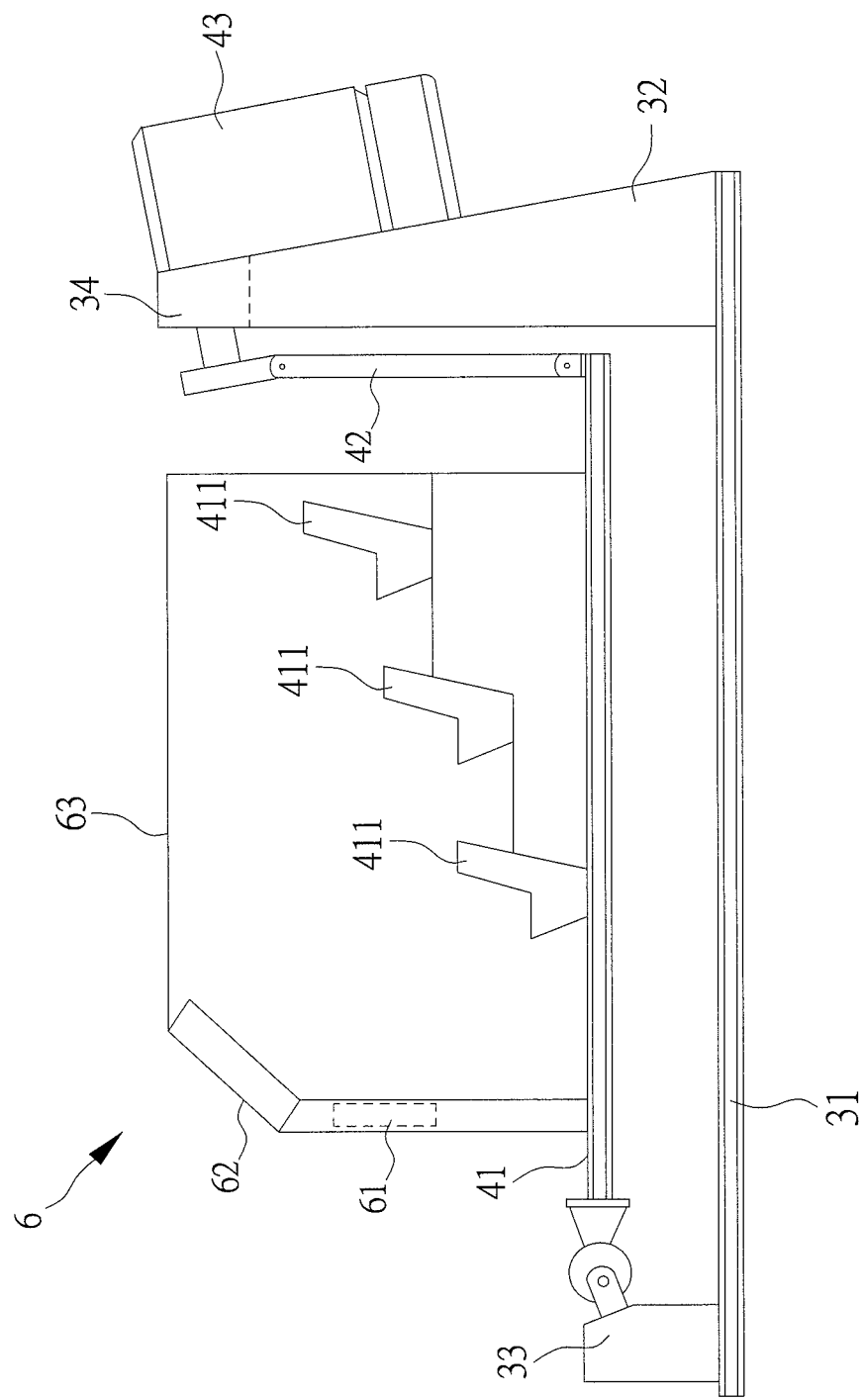
FIG. 12 is a side view of a sixth preferred embodiment according to the present invention.
Figure 13:
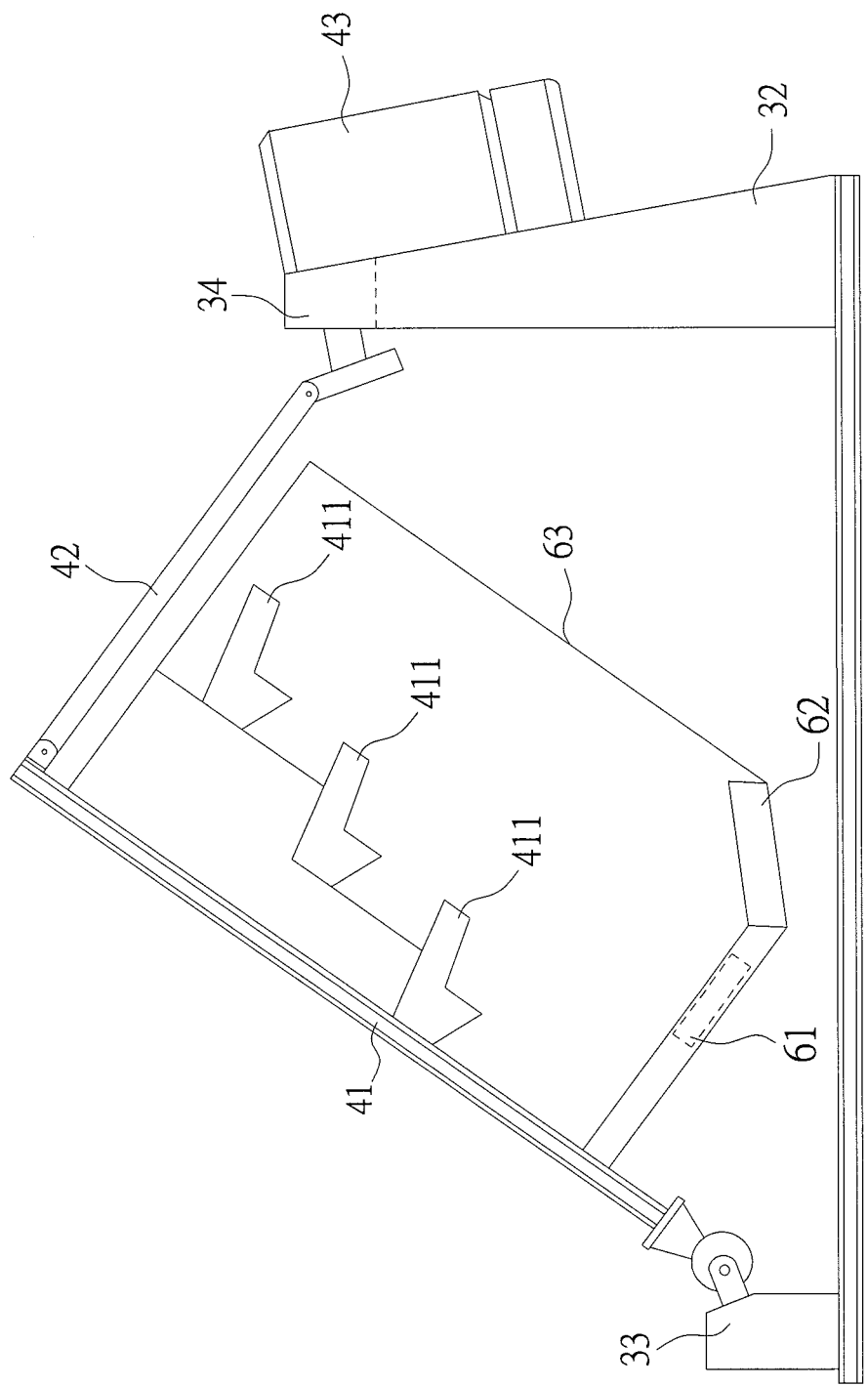
FIG. 13 is a side view depicting the diving movement of the sixth embodiment.

With reference to FIGS. 12, 13, a sixth preferred embodiment according to an embodiment of the present invention is depicted which is similar to the second embodiment, and so common features are not described again. The difference is that the present invention further includes a haptic feedback unit 6.

The haptic feedback unit 6 includes a haptic feedback controlling component 61 installed with a haptic feedback program, and an image display component 62 disposed on the rolling base 41 and electrically connected to the haptic feedback controlling component 61. When the haptic feedback program is executed by the haptic feedback controlling component 61, the rotating power component 43, the actuation component 44 and the image display component 62 can be controlled.

The haptic feedback controlling component 61 is a computer wherein the installed program can simulate roller coaster experience. The image of the haptic feedback program can be shown on the image display component 62 by the haptic feedback controlling component 61, and the rotating power component 43 and the actuation component 44 are driven in response to the setting of the haptic feedback program. In this case, the installed program can also simulate spaceship experience, and so should not be construed as limiting the invention.

The sixth preferred embodiment depicts a huge haptic feedback recreational facility being capable of carrying plural persons A, and a cabin 63 is dispose on the rolling base 41, wherein plural carrying components 411 are disposed. The carrying components 411 are standard seats providing to the plural persons A. Preferably, the image display component 62 is disposed in the cabin 63, so that the plural persons A seated inside can watch the images displayed by the program.

It is worth pointing out that the rotation base 41 can rotate around the roll center line 35 driven by the rotating power component 43 to perform a cone rotation, and the cabin 63 will roll. When the cabin 63 is in roll position, the first rolling component 33 is lower than the second rolling component 34, so that the persons A seated in the cabin 63 can have haptic feedback of diving.

Therefore, the rotating power component 43 can not only simulate roll coaster experience, but also diving experience. The conventional recreational facilities only provide horizontal swinging experience, but not rolling experience. Furthermore, plural motors are required to simulate diving experience in the conventional recreational facilities, so the amount of motor can be reduced effectively by the present invention.

Figure 14:
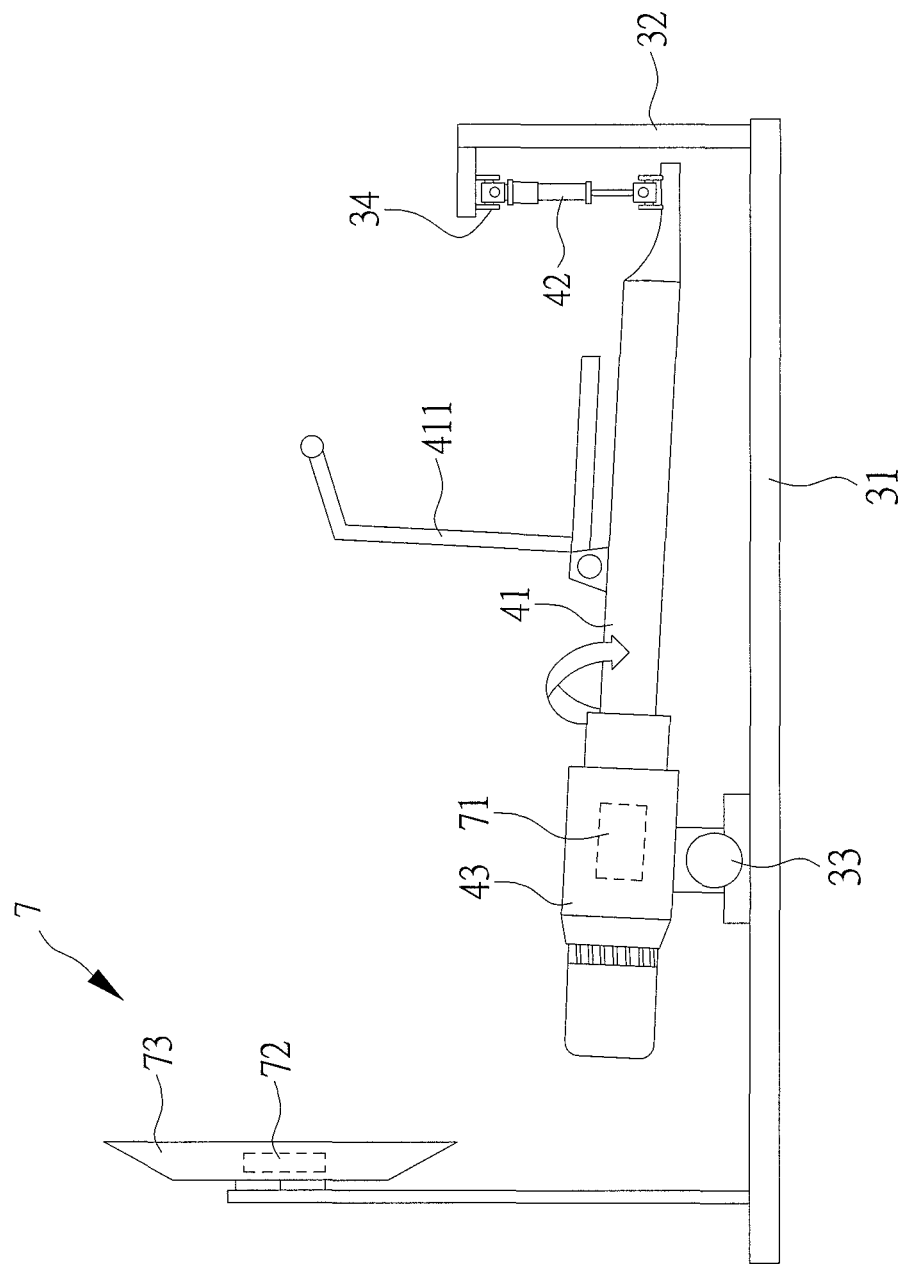
FIG. 14 is a side view of a seventh preferred embodiment according to the present invention.

With reference to FIG. 14, a seventh preferred embodiment according to an embodiment of the present invention is depicted which is similar to the fourth embodiment, and so common features are not described again. The difference is that the present invention further includes a slip gaming unit 7.

The slip gaming unit 7 includes an angle detecting part 71 being capable of detecting the rotating angle of the rolling base 41, a game controlling component 72 electrically connected to the angle detecting part 71, and a game display component 73 electrically connected to the game controlling component 72. When the game controlling component 73 executes a game program, and receives the angle information detected by the angle detecting part 71, the rotating power component 43, the actuation component 44 and the game display component 73 can be controlled.

The seventh preferred embodiment depicts a water skiing arcade game, wherein the carrying component 411 is a standing platform, and a rope handle is equipped to simulate the connection to a boat. The person A standing on the carrying component 411 can change its body center of gravity, so that the rolling angle of the rolling base 41 and the stability of game can be controlled.

The game program can simulate a water skiing experience. When the game controlling component 72 executes the game program, and the image of the game display component 73 will be shown in response to the angle information detected by the angle detecting part 71. The game controlling component 72 in response to the program setting can simulated the haptic feedback of wave by the rotating power component 43 and the actuation component 44.

In this case, the seventh preferred embodiment can also be applied to a snow slide arcade game, and the carrying component 411 can be designed for a snowboard. Two ski poles can be disposed on two sides of the carrying component 411, so that the person A can change its body center of gravity and the direction in the game can be controlled by the angle of rolling base 41.

With the aforementioned descriptions, the following benefits of the present method can be obtained:

1. Offering the Haptic Feedback of Acceleration and Deceleration

The actuation component can lower the rear wheel when accelerating, and can lift the rear wheel when decelerating for providing haptic feedback.

2. Improving the Slip Experience

When the rider speed in the game is too high and the lean angle is too steep, the wheel slip will be detected by program, and the actuation component controlled by the game controlling component will simulate the rear wheel slip, so that the person can have haptic feedback of wheel slip.

3. Reducing the Amount of Motors

The rotating power component can not only simulate roll coaster experience, but also diving experience. The conventional recreational facilities only provide horizontal swinging experience, but not rolling experience. Furthermore, plural motors are required to simulate diving experience in the conventional recreational facilities, so the amount of motor can be reduced effectively by the present invention 4. Simplifying the Structure Because of the third benefit, the present invention does not require plural motors for providing haptic feedback, and the steering and slip experience can be simulated by the first and the second rolling component, the structure can be simplified.

In conclusion, the rolling base can rotate around the roll center line and a cone rotation can be performed, so that the roll, pitch and yaw movement can be simulated. Compare to the conventional racing game, much more realistic haptic feedback and simple structure can be reached, so that the objectives of the present invention can be obtained.

The foregoing detailed description is merely in relation to seven preferred embodiments and shall not be construed as limiting the invention. It is to be understood that many other possible modifications and variations can be made without departing from the spirit and scope of the invention as hereinafter claimed.

What is claimed is:

1. A haptic feedback device for steering simulation, comprising:
    a base unit including a base, a base supporting body extended upward from the base, a first rolling component located on the base, a second rolling component located on top of the base supporting body, and a roll center line formed by the first and the second rolling components; and
    a rolling unit including a rolling base being capable of carrying at least one person, and a rolling supporting body connected to the rolling base,
    wherein the rolling base has a first end and a second end opposite from the first end, the rolling supporting body has a third end and a fourth end opposite from the third end, the first end of the rolling base is pivotally connected to the first rolling component, the second end of the rolling base is connected to the third end of the rolling supporting body, and the fourth end of the rolling supporting body is pivotally connected to the second rolling component, so that the rolling base rotates around the roll center line and a cone rotation is performed, and
    wherein the rolling supporting body is provided with a length-adjustable actuation component to control length of the rolling supporting body.

2. The haptic feedback device as claimed in claim 1, wherein the first and second rolling components are respective bearings, and the roll center of the first and second rolling components is aligned with the roll center line.

3. The haptic feedback device as claimed in claim 1, wherein height of the first rolling component is lower than the second rolling component.

4. The haptic feedback device as claimed in claim 1, wherein the rolling unit further includes a rotating power component being capable of rotating the rolling base.

5. The haptic feedback device as claimed in claim 4, wherein the rotating power component is provided at the first rolling component to rotate the rolling base.

6. The haptic feedback device as claimed in claim 4, wherein the rotating power component is provided at the second rolling component to rotate the rolling base.

7. The haptic feedback device as claimed in claim 1, wherein the rolling unit further includes a first joint component disposed between the first rolling component and the rolling base, a second joint component disposed between the second rolling component and the rolling supporting body, and a third joint component disposed between the rolling base and the rolling supporting body.

8. The haptic feedback device as claimed in claim 1, wherein the rolling supporting body is provided with a first rolling supporting shaft connected to the second rolling component, and a second rolling supporting shaft connected to a third joint component; and the rolling unit further includes a fourth joint component disposed between the first and the second rolling supporting shafts.

9. The haptic feedback device as claimed in claim 1, wherein the base unit further includes a swing component with at least two axles.

10. The haptic feedback device as claimed in claim 1, wherein a carrying component being capable of carrying a person is disposed on the rolling base, which is selected from a set consisting of standing platform, standard seat, straddle seat, supine-position platform, and prone-position platform.

11. The haptic feedback device as claimed in claim 1, further comprising a motorcycle gaming unit, which includes a motorcycle controlling component disposed on the rolling base, a game controlling component electrically connected to the motorcycle controlling component, and a game display component electrically connected to the game controlling component, so that a controlling order is sent to the game controlling component by the motorcycle controlling component, and the game controlling component controls the haptic feedback device.

12. The haptic feedback device as claimed in claim 1, further comprising a haptic feedback unit, which includes a haptic feedback controlling component installed with a haptic feedback program, and an image display component electrically connected to the haptic feedback controlling component; when the haptic feedback program is executed by the haptic feedback controlling component, the operation of the haptic feedback device is controlled.

13. The haptic feedback device as claimed in claim 1, further comprising a slip gaming unit, which includes an angle detecting part being capable of detecting the rotating angle of the rolling base, a game controlling component electrically connected to the angle detecting part, and a game display component electrically connected to the game controlling component; when the game controlling component executes a game program, and receives the angle information detected by the angle detecting part, the operation of the haptic feedback device is controlled.

* * * * *